United States Patent [19]
Neal

[11] 3,926,812
[45] Dec. 16, 1975

[54] FLOATAGE CONCENTRATING EQUIPMENT FOR NAUTICAL FLOATAGE RECOVERY APPARATUS

[75] Inventor: Robert W. Neal, Watertown, Mass.

[73] Assignee: JBF Scientific Corporation, Burlington, Mass.

[22] Filed: Sept. 3, 1974

[21] Appl. No.: 502,393

[52] U.S. Cl............................. 210/242; 210/DIG. 21
[51] Int. Cl.².......................................... E02B 15/04
[58] Field of Search............... 210/83, 242, DIG. 21; 61/1 F

[56] References Cited
UNITED STATES PATENTS

| | | | |
|---|---|---|---|
| 2,330,508 | 9/1943 | McColl | 210/242 |
| 2,608,300 | 8/1952 | Small | 210/242 |
| 3,661,264 | 5/1972 | Peterson et al. | 210/DIG. 21 |
| 3,700,108 | 10/1972 | Richards | 210/DIG. 21 |
| 3,716,142 | 2/1973 | Bianchi | 210/DIG. 21 |
| 3,815,751 | 6/1974 | Pavlovic | 210/242 |
| 3,822,789 | 7/1974 | Crisafulli | 210/DIG. 21 |

*Primary Examiner*—Theodore A. Granger
*Attorney, Agent, or Firm*—Kenway & Jenney

[57] ABSTRACT

A nautical vessel for recovering floatage entrained at a bow opening deploys boom-mounted floatage-concentrating sweeps arranged to enter the bow opening, without collision with the hull, when undergoing motion due to heavy seas. Sealing barriers are affixed to the hull and in sliding engagement with each sweep to prevent leakage of sweep-engaged floatage at each sweep-vessel juncture.

9 Claims, 4 Drawing Figures

FLOATAGE CONCENTRATING EQUIPMENT FOR NAUTICAL FLOATAGE RECOVERY APPARATUS

BACKGROUND

This invention relates to a nautical craft for concentrating floatage and recovering it from a body of water. In particular the invention provides a floatage recovering craft which deploys floatage-concentrating sweeps configured for effective use in rough seas.

U.S. Pat. No. 3,804,251 discloses a floatage recovery craft with which the present invention can be used. That craft has a bow opening in which is located a downwardly-inclined conveyer belt that engages floatage in the path of the vessel and diverts it into a holding reservoir. Floatage recovery craft of this and similar types are more effective, in that they can cover a larger area, when fitted with sweeps forward of the bow to concentrate floatage from a wide path and funnel it into the bow opening. U.S. Pat. No. 3,716,142 discloses one construction of sweeps for such use.

It has heretofore however been difficult to deploy sweeps for floatage concentrating operation in heavy seas. This is because in the prior art the motion of the sweeps and of the supporting vessel in heavy seas either lifts the sweeps out of the water or submerges them below the surface, so that concentrated floatage slips by and remains unrecovered. When prior sweeps are deployed with freedom for relatively large movement independent of the craft, in order to allow each sweep to remain on the water surface in heavy seas, the heel of the sweep often collides with the vessel hull. This causes significant and often serious damage to either the vessel or the sweep, or both. Deployment of the sweeps spaced further from the hull to minimize this collision problem introduces a further problem, however, in that a larger barrier is required to bridge between the heel of each sweep and the vessel hull. With prior constructions it is difficult to maintain the barrier sealed to both the vessel and the sweep throughout the differential motion between the craft and the sweep, particularly in heavy seas.

Accordingly, it is an oject of this invention to provide improved nautical apparatus for floatage concentration and recovery capable of operation in heavy seas.

A more particular object is to provide a floatage recovery craft with concentrating sweeps deployed for essentially spill-free operation in heavy seas.

It is also an object of the invention to provide an improved barrier for use between concentrating sweeps and a floatage recovery vessel.

Other objects of the invention will in part be obvious and will in part appear hereinafter.

GENERAL DESCRIPTION

Floatage concentrating and recovering equipment according to the invention deploys sweeps forward of a vessel in a manner that allows each sweep to move with the action of a heavy sea in such a manner that it continually remains on the water surface, but does not collide with the vessel. By remaining on the water surface, the sweep blocks collected floatage from spilling by it. The vessel recovers floatage which it engages at bow opening, and deploys two diverging sweeps forward of the bow to concentrate floatage and funnel it to the bow opening.

The deployment of each sweep from the vessel allows the sweep to move vertically, i.e. heave, and to rotate about a transverse horizontal axis, i.e. to pitch, along a path that carries the heel of the sweep into the bow opening without collision with the vessel. More particularly, each sweep is located forward of the bow opening of the vessel and is oriented with its longitudinal axis directed into the opening. Each sweep is deployed on a mounting boom hinged to the vessel and to the sweep. The two hinge axes for each sweep are parallel and normally horizontal, but are transverse to the length of the sweep.

With this construction, each sweep moves freely in response to sea action by undergoing rotational movement about one or both associated articulation axes, but with the longitudinal axis of the sweep constrained in a normally vertical plane. That is, the doubly-articulated deployment of each sweep allows it to move freely about the two parallel axes of rotation but constrains the longitudinal axis of the sweep from movement other than along the normally vertical plane which passes through it. The result of these constraints is that the heel of each sweep enters the bow opening of the vessel, rather than colliding with the vessel, when that sweep undergoes heavy sea motion.

A further result of the foregoing arrangement is that a barrier affixed to the vessel and in sliding engagement with the sweep along its longitudinal axis slides along the sweep during heavy sea motion but maintains an essentially leak-proof sealing engagement with the sweep throughout this motion.

In the foregoing manner the invention provides floatage concentrating sweeps that remain afloat and securely sealed with a floatage recovering vessel, without the sweeps being submerged or lifted out of the water in heavy seas and hence with minimum leakage of floatage by the sweeps. Further, there is no danger of damage to either the sweeps or the vessel hull due to collision between them.

The invention accordingly comprises the features of construction, combinations of elements, and arrangement of parts exemplified in the constructions hereinafter set forth, and the scope of the invention is indicated in the claims.

BRIEF DESCRIPTION OF DRAWINGS

For a fuller understanding of the nature and objects of the invention, reference should be made to the following detailed description taken in connection with the accompanying drawings, in which.

DESCRIPTION OF ILLUSTRATED EMBODIMENTS

Figures 1, 2:
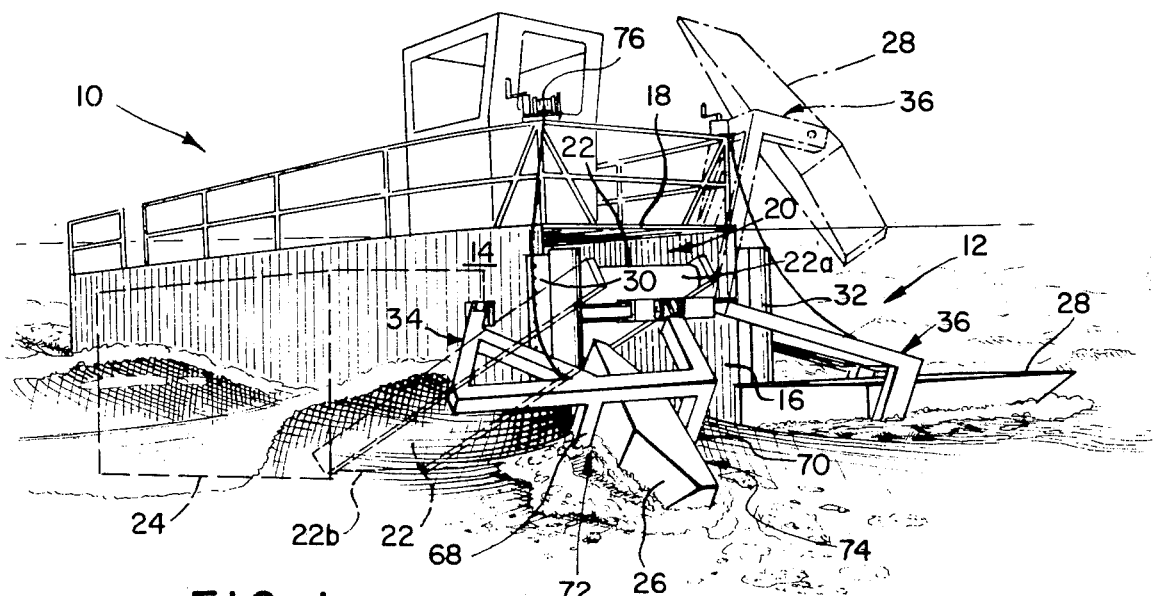
FIG. 1 is a perspective view of nautical floatage collecting and recovering craft embodying the invention.
FIG. 2 is a fragmentary plan view of the bow portion of the recovery and collection equipment of FIG. 1.

The floatage recovery equipment of the invention shown in FIG. 1 includes a nautical floatage-recovering vessel 10 with a floatage-concentrating sweep system 12 deployed forward of the vessel bow. The vessel 10, which can be constructed in accordance with the disclosure in the above-mentioned U.S. Pat. No. 3,804,251, has a hull formed by two spaced-apart pontoons 14 and 16 and a deck 18 spanning between them.

This construction provides a passage between the pontoons and which has an opening 20 at the bow of the vessel 10 and through which floatage is entrained for recovery. Further, the vessel 10 mounts a driven, downwardly-inclined, floatage transporting belt 22 in the passage between the pontoons 14, 16. The upper end 22a of the belt is located adjacent the bow of the vessel behind the opening 20 and above the water line, whereas the other end 22b of the belt is submerged below the water line intermediate the length of the vessel. Immediately aft of the lower end of the belt 22, the vessel has a floatage collecting well 24 with an open bottom. With this arrangement of the belt and collection well, the vessel 10 engages floatage under the belt adjacent the bow opening, and submerges the floatage under the belt and moves it aftward. At the lower end of the belt, where the belt turns and returns to the upper, forward end, the floatage is released. It buoyantly rises into the collection well 24, where it is baffled from being carried away by currents in the water and from which it can be pumped to holding tanks on the vessel or to other storage.

The vessel 10 preferably typically is self-propelled, typically with an outboard drive at the vessel stern. However, it can be a towed barge, or be moored in a body of moving water.

With reference to FIGS. 1 and 2, the floatage concentrating system 12 employs a pair of sweeps 26 and 28 deployed forward of the vessel 10 and diverging from the bow opening 20, as shown. The sweeps are buoyant and normally float on the surface of the water with a draft of several inches. The sweeps engage floatage in their path as the vessel 10 moves forward relative to the water and, in a well-known manner, concentrate the engaged floatage by funneling it toward and into the bow opening 20.

A barrier 30 is fixed to the vessel pontoon 14 and slidingly engages the sweep 26 adjacent the vessel to block floatage from escaping around the heel of the sweep and passing outside the vessel 10. A similar barrier 32 seals floatage from leaking around the heel of the other sweep 28.

Each sweep is deployed on a boom-like frame 34, 36, each of which is pivoted at one end to the vessel 10 and pivoted at the other end to its associated sweep 26, 28 respectively. FIG. 2 shows that for each frame 34, 36, the two sets of pivotal connections allow rotation about parallel axes, e.g. the rotation axes 38 and 40 of the frame 34 are parallel. Further these axes are perpendicular to the length of the associated sweep, i.e. the rotation axes 38 and 40 are perpendicular to the longitudinal axis 42 of sweep 26. This longitudinal axis of each sweep is aligned with the vessel hull opening 20 and the sweep is so located that if translated along that axis toward the vessel, it freely fits between the vessel pontoons, i.e. within the opening 20.

With this arrangement, each sweep can pivot around its connection with its associated frame, and its associated frame can pivot at the connection with the vessel hull. These movements enable the sweep to remain buoyed on the water surface as it and the vessel ride in rough water. However, each sweep is constrained from sideways motion and from rotation in the horizontal plane, i.e. the plane of FIG. 2, independent of the vessel 10. Hence, the motion of each sweep independent of the vessel is constrained to be along the plane which is orthogonal to the parallel axes of its rotation (e.g. the axes 38 and 40 for sweep 26) and which lies along its longitudinal axis (e.g. axis 42 of sweep 26).

However, within this normally-vertical plane, each sweep freely can undergo relatively large independent motion due to sea action, as FIG. 1 shows. Consequently, as the vessel 10 and each sweep move independent of one another, as occurs in heavy seas, each sweep can buoyantly remain on the water surface.

Figure 3:
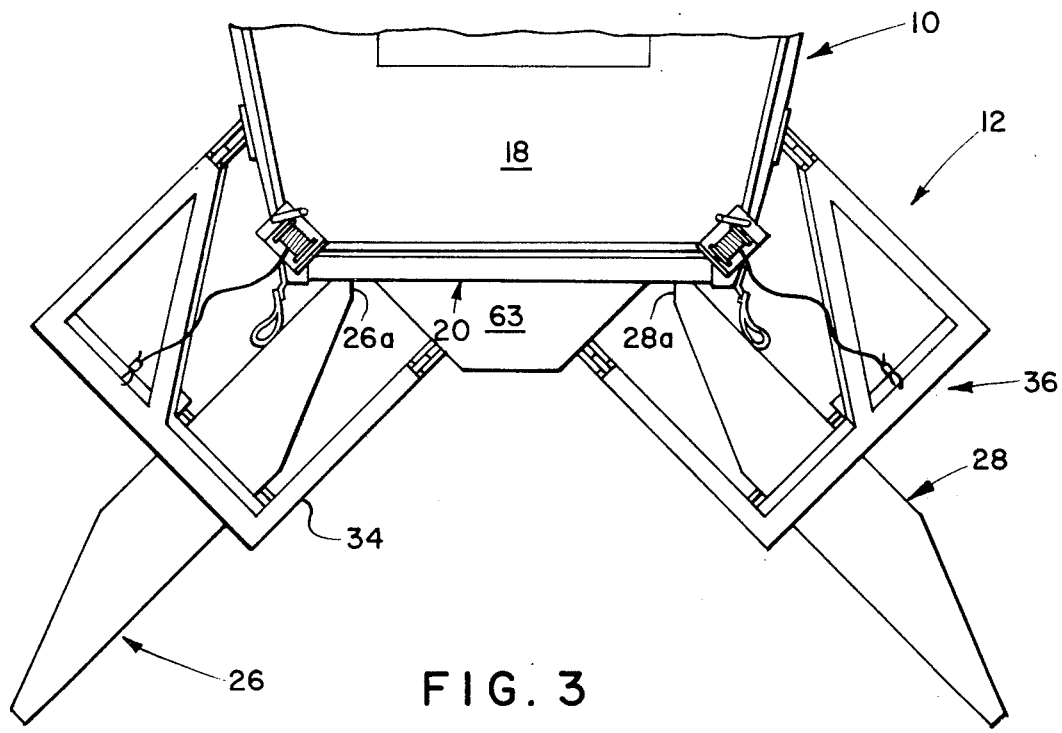
FIG. 3 is a view similar to FIG. 2 except showing the concentrating sweeps displaced for extension into the bow opening of the vessel.

Further, as each sweep undergoes a large excursion of such motion in the direction toward the vessel, its heel enters the hull opening 20, without collision with the vessel. FIG. 3 illustrates this condition, which typically occurs when the vessel bow heaves upward relative to one or both sweeps. In FIG. 3, each frame 34, 36 is pivoted steeply downward from the vessel 10, which draws the associated sweep so close to the vessel that the heel of each sweep enters the vessel opening 20.

Figure 4:
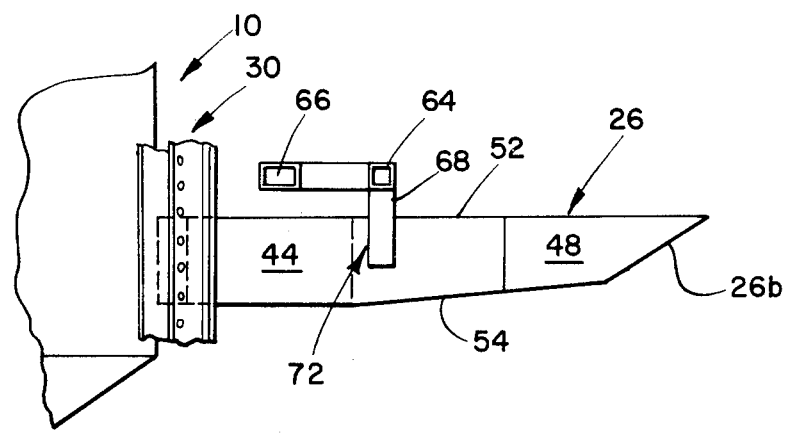
FIG. 4 is a side elevation view taken along line 4—4 of FIG. 2.

Referring now to FIGS. 1, 2 and 4, the illustrated sweep 26 has a generally rhombic configuration when viewed in the horizontal plane of FIG. 2. The sweep forms this configuration with a back side 44 which extends forward from the heel 26a of the sweep and is opposite and parallel to a front side 46, which extends back from the sweep nose 26b. Each side 44 and 46 is parallel to and equally spaced from the parallel, central longitudinal axis 42 of the sweep. The other rhombic-forming sides of the sweep 26 are opposed and parallel sides 48 and 50, the former extending between the back side and the nose of the sweep and the latter extending between the front side and the heel of the sweep. All four sides 44, 46, 48 and 50 are flat, normally vertical panels. The illustrated sweep departs slightly from a completely rhombic configuration in that the heel and nose are foreshortened as indicated; the foreshortening of the heel provides a tapered transition from the sweep to the mouth of the vessel 10. As further shown in the drawings, the top 52 and bottom 54 of the illustrated sweep 26 are flat, parallel and normally-horizontal panels. The sweep is constructed with this configuration of material suitable to provide the desired buoyancy and the requisite strength and rigidity.

The other sweep 28 is, as shown, constructed identical to the above-described sweep 26 but with a mirror image configuration.

The illustrated boom frame 34 is a braced frame having parallel boom arms 56 and 58, each of which is pivotally mounted to the vessel 10 at one end thereof for rotation of the frame about axis 38. As shown, this mounting and correspondingly the axis 38 is spaced vertically above the axis 40 of sweep-boom rotation. The pivotal connection 60 of arm 56 with the vessel is along the side of hull 14 whereas the pivotal connection 62 of the arm 58 to the vessel is affixed to a bow plate 63 mounted between the vessel hulls 14 and 16 and spanning across the vessel opening. The boom frame 34 further has a cross arm 64 which interconnects the other ends of the boom arms 56 and 58, and a brace arm 66 extends between the cross arm and the boom arm 56. With this construction and double pivot connection to the vessel, the boom frame 34 is highly resistant to deformation.

The boom frame 34 pivotally mounts the sweep 26 at the lower ends of arms 68 and 70 which depend from the cross arm 64 adjacent the front and back sides of the sweep. The pivotal connections 72 and 74 of the depending arms with the sweep are coaxial with the rotation axis 40. The rotation axis 40 preferably is located, relative to the length of sweep 26, to pass through or substantially close to the center of gravity of the sweep. Although the axis 40 can also be located heightwise of the sweep to pass through or close to this center of gravity, it preferably is displaced upward from the center of gravity to above the water line of the sweep. This is desirable in order to minimize drag, and agitation of floatage, by the pivotal connecting structure in the water and hence to remove the lower ends of the depending arms 68 and 70 to above the normal water line of the sweep.

Again, the construction and configuration of the illustrated boom frame 36, and its pivotal connection with sweep 28, is identical to that described above for the boom frame 34, except with a mirror image arrangement as shown.

In addition to deploying the sweeps 26 and 28, each boom frame can be raised to lift the associated sweep from the water, as is desirable when the vessel 10 is not engaged in a floatage recovery operation. For this purpose, as shown in FIG. 1, winches 76 and 78 are mounted on the vessel 10, preferably elevated above the deck 18 and adjacent the bow as illustrated. The cable 80 of winch 76 connects to the cross arm of frame member 30, and the winch cable 82 is similarly connected with the frame 36. As FIG. 1 indicates in phantom for sweep 28, each winch can lift the associated frame member, about the axis of rotation by which it is affixed to the vessel, and thereby lift the associated sweep from the water. When the sweeps are deployed, the winch cables are slack to allow the boom frames to rotate as freely as desired.

The illustrated barrier 30 is affixed to the vessel hull adjacent the bow opening 20. It spans from the hull to the sweep 26 and slidingly engages the back side 44 of the sweep. This side is normally vertical, as is the barrier, and by virtue of the pivotal mounting of the sweep to the hull, the two elements, i.e. the sweep side 44 and the barrier 30, remain parallel and spaced apart by a fixed distance as the vessel 10 navigates in heavy seas and the like. Accordingly, the barrier 30 remains in sliding engagement with the sweep side 44 as the sweep rides in rough seas, and thus the barrier maintains a floatage-blocking seal between the vessel and the sweep. The sweep barrier illustratively is constructed with a resilient seal element 30a resiliently maintained pressing against the sweep side 44 by a metal or like mounting plate 30b. The seal element preferably is formed as a fold of stiffly resilient, and floatage impervious and resistant material, such as heavy duty conveyor belting of fiber-reinforced polyvinyl chloride. The folded seal element is mounted with the two ends of the fold affixed to the edge of the mounting plate 30b as shown, so that the fold bears against the sweep. Further, both the mounting plate and the seal element extend vertically throughout the range of possible excursion of the sweep 26 as it rides in heavy seas. The seal barrier 32 is constructed and mounted identically to the above-described barrier 30.

Summarizing the operation of the equipment which the invention provides, the floatage recovery vessel 10 transports the concentrating sweeps in the elevated position shown in phantom in FIG. 1 to the site of an oil spill or like condition of floating debris. At the site where floatage is to be collected, the sweeps are winched down by way of their associated boom members to ride on the water surface. As the vessel and the buoyed sweeps encounter sea action, each sweep pivots about its mounting, forward axis and each boom frame pivots about the parallel, rear axis. The motion of each sweep about these two axes associated with it is fixed in a normally-vertical plane of sweep motion which passes through the longitudinal axis of each sweep and is transverse to the two rotation axes. Further, the back side of each sweep, which is the aft-most or trailing surface, extends parallel to this plane of sweep motion, and is located to enter the floatage-receiving opening of the vessel. Thus, each sweep moves independent of the other sweep and of the vessel as the equipment is subjected to extreme rolling, pitching and heaving motions due to operation in heavy seas. The sweeps do not collide with the hull, but instead move into and out of the hull opening. The floatage-blocking barriers, moreover, slidingly engage the back sides of the sweeps continually and with uniform contact pressure throughout the heavy sea motion. Hence, there is minimal loss of floatage passed the sweeps, and at the juncture between each sweep and the recovery vessel.

As a measure of performance of the invention, a 38 foot vessel fitted with nine-foot long sweeps, all constructed as shown in the drawings, can successfully recover oil floatage under Sea State Three conditions and with a vessel roll of up to 35° in either direction It will thus be seen that the objects set forth above, among those made apparent from the preceding description, are efficiently attained. Since certain changes may be made in the above construction without departing from the scope of the invention, it is intended that all matter contained in the above description or shown in the accompanying drawings shall be interpreted as illustrative and not in a limiting sense. For example, although described with reference to the collection of floatage from a body of water, elements of the invention are not limited to this application and may be useful in other environments where it is desired to deploy a sweep member forward of a vessel.

It is also to be understood that the following claims are intended to cover all of the generic and specific features of the invention herein described, and all statements of the scope of the invention which, as a matter of language, might be said to fall therebetween.

Having described the invention what is claimed as new and secured by Letters Patent is:

1. In buoyant nautical apparatus for the concentration and recovery of floatage from a body of water and having a vessel with a floatage-receiving bow opening and having at least one sweep deployed forward of the vessel bow for concentrating floating toward such opening, the improvement comprising
   sweep deployment means hingedly connected to each such sweep at a location spaced from both longitudinal ends of the sweep and hingedly connected to the vessel for deploying the sweep forward of the vessel bow, said hinged connections of said deployment means mountingly locating each such sweep aligned with the vessel bow opening and accommodating motion of the sweep relative to the vessel which is directed vertically and longitudinally of the sweep and which is constrained to carry the sweep into and out of the vessel bow opening without collision with the vessel.

2. In apparatus according to claim 1, the further improvement comprising
   a floatage barrier associated with such sweep and extending between the vessel and the sweep, said barrier being affixed to such vessel and engaging the associated sweep throughout said relative movement thereof with a sliding, floatage-blocking seal.

3. In apparatus according to claim 1 wherein such sweep has a longitudinal axis, the further improvement wherein said deployment means includes motion-constraining means for restricting the motion, due to sea action, of such sweep to movement wherein such longitudinal axis remains within a normally-vertical plane passing through that axis.

4. In apparatus according to claim 3, the further improvement
  A. wherein such sweep has a planar surface parallel to said normally-vertical plane which passes through the longitudinal axis thereof, and
  B. comprising a floatage barrier associated with such sweep and extending between the vessel and the sweep, said barrier being affixed to such vessel and engaging the associated sweep along said planar surface with a sliding, floatage-blocking seal.

5. In apparatus according to claim 1, the further improvement comprising
  a floatage barrier associated with such sweep and extending between the vessel and the sweep, said barrier being affixed to one element selected from such vessel and the sweep, and engaging the other such element with a sliding floatage-proof seal along a surface that remains at a fixed distance from the former element during said motion, due to sea action, of such sweep relative to the vessel.

6. Apparatus for deploying floatage-concentrating sweeps forward of the bow of a nautical vessel having a bow opening for the receipt of floatage, said apparatus comprising in combination
  A. a pair of buoyant elongated sweeps for deployment forward of the vessel bow in a divergent configuration, each sweep having a flat, normally-vertical back surface extending longitudinally of the length thereof from the heel thereof toward the nose thereof, and
  B. a pair of mounting booms, each adapted for mounting one associated sweep to such vessel and each
    1. having hinge means adapted for being mountingly affixed to the vessel for relative boom-vessel rotation about a first axis,
    2. mountingly affixed to the associated sweep for relative boom-sweep rotation about a second axis parallel to said first axis, with said first and second axes associated with each sweep being different from those associated with the other sweep and being perpendicular to the longitudinal extension of said back surface of the associated sweep, and
    3. disposing the associated sweep with the width thereof in line with such bow opening.

7. Apparatus according to claim 6 wherein each boom is affixed to the associated sweep to dispose the associated second axis, relative to the longitudinal extension of the sweep, substantially at the sweep center of gravity.

8. In buoyant nautical apparatus for the concentration and recovery of floatage from a body of water and having a vessel with a floatage-receiving bow opening and having a pair of buoyant elongated sweeps deployed forward of the vessel bow in a divergent configuration for concentrating floatage toward such opening, the improvement comprising
  A. a pair of mounting booms, each of which
    1. is associated with one such sweep and is mountingly affixed thereto with a pivotal connection for relative sweep-boom rotation about an axis transverse to the elongation of that sweep,
    2. is mountingly affixed to said vessel with a pivotal connection for relative boom-vessel rotation about a further axis parallel to, and spaced vertically above, the associated axis of sweep-boom rotation,
    3. disposes the associated boom aligned along the elongation thereof with the vessel bow opening,
  so that relative sweep-vessel motion of each such sweep is constrained about said axes associated therewith and moves such sweep relative to the vessel opening along a path that extends into such opening without sweep-vessel interference.

9. In buoyant apparatus according to claim 8, the further improvement comprising
  A. a surface on each sweep extending longitudinally of the elongation thereof from the heel of the sweep toward the nose thereof and which remains at a substantially fixed distance from such vessel during said motion due to sea action of such sweep relative to the vessel, and
  B. a floatage barrier associated with each sweep and bridgingly extending between the vessel and such sweep, said barrier being affixed to such vessel and engaging the associated sweep with a sliding floatage-proof seal along said surface thereof.

* * * * *